US006669375B1

(12) United States Patent
Bonja et al.

(10) Patent No.: US 6,669,375 B1
(45) Date of Patent: Dec. 30, 2003

(54) MULTI-FIBER, IN-LINE ATTENUATOR MODULE AND ASSEMBLY FOR OPTOELECTRONIC NETWORKS

(75) Inventors: Jeffrey A. Bonja, Sturbridge, MA (US); Mark E. Fillion, Rumford, RI (US); Andre A. Vankov, Mansfield, MA (US)

(73) Assignee: Advanced Interconnect, Inc., Franklin, MA (US)

( * ) Notice: Subject to any disclaimer, the term of this patent is extended or adjusted under 35 U.S.C. 154(b) by 0 days.

(21) Appl. No.: 10/219,452

(22) Filed: Aug. 15, 2002

(51) Int. Cl.[7] .................................................. G02B 6/38
(52) U.S. Cl. .......................... 385/73; 385/140; 439/369
(58) Field of Search .............................. 385/38, 49, 60, 385/72, 73, 78, 140, 88, 89, 92; 439/76.1, 936, 369

(56) References Cited

U.S. PATENT DOCUMENTS

| | | | | | |
|---|---|---|---|---|---|
| 5,701,382 | A | * | 12/1997 | Grois et al. ................. | 385/140 |
| 5,734,778 | A | * | 3/1998 | Loughlin et al. ............ | 385/140 |
| 6,250,818 | B1 | * | 6/2001 | Loughlin et al. ............ | 385/86 |
| 6,256,446 | B1 | * | 7/2001 | Brunsting et al. .......... | 385/140 |
| 6,464,517 | B1 | * | 10/2002 | Jones ......................... | 439/138 |

* cited by examiner

Primary Examiner—Khiem Nguyen
(74) Attorney, Agent, or Firm—Lucash, Gesmer & Updegrove, LLP

(57) ABSTRACT

A multi-fiber in-line attenuator module configured for insertion in the fiber optic pathway of an optoelectronic network to provide a predetermined value of attenuation for all propagating modes in the pathway includes first and second multi-channel interface members each having a mating face, an interconnect face, and alignment holes and n-optical channels formed therethrough, a multi-fiber ribbon cable terminating in the interconnect face of each multi-channel interface member with the optical fibers thereof disposed in the n-optical channels, alignment pins disposed in the alignment holes of the first and second multi-channel interface members so that the n-optical channels of the first and second multi-channel interface members are optically aligned, a mating clip for retaining the first and second multi-channel interface members in mated combination, and an NDF (neutral density filter) film adhered to at least one of the mating faces of the first and second the multi-channel interface members, the adhered NDF film having a predetermined composition and thickness to provide the predetermined value of attenuation for the multi-fiber in-line attenuator module.

26 Claims, 5 Drawing Sheets

MULTI-FIBER, IN-LINE ATTENUATOR MODULE AND ASSEMBLY FOR OPTOELECTRONIC NETWORKS

FIELD OF THE INVENTION

This invention relates generally to high data rate optoelectronic networks, and, more particularly, to a multi-fiber, in-line attenuator module and assembly configured for insertion in the fiber optic pathway of an optoelectronic network between a semiconductor laser and a semiconductor detector to attenuate the optical power levels by a predetermined value for all propagated modes, i.e., attenuation is mode independent.

BACKGROUND OF THE INVENTION

The need for greater information bandwidth has led to the increased use of optoelectronic networks operating at and above 1 gigabit/s, i.e., the Gigabit Ethernet. And, in particular, the 10-Gigabit Ethernet is a developing optoelectronic technology that offers data speeds up to 10 billion bits (gigabits) per second. It is not uncommon in such high-speed optoelectronic networks to have a requirement for a fixed value of attenuation in the fiber optic pathway, most typically to prevent saturation or overloading of a semiconductor detector. A fixed-value attenuation requirement can also be imposed in branched optoelectronic networks to balance optical power levels in the different branches.

Such an attenuation requirement can be fulfilled by an adjustable attenuation mechanism or a fixed value attenuation mechanism. Traditional attenuation mechanisms include a separation or gap (air) between adjacent fibers (gap-loss attenuation), where such separation attention mechanisms may be either fixed value, see, e.g., U.S. Pat. No. 5,701,382, or adjustable, see, e.g., U.S. Pat. No. 5,734,778, lateral offset or core mismatch between adjacent fibers, or the introduction of blocking material between adjacent fibers.

Achieving a fixed-value attenuation requirement in high-speed optoelectronic networks, however, using one of these fixed value attenuation mechanisms becomes more complex due to the use of multimode fibers and laser light sources in such networks. High-speed optoelectronic networks tend to use multimode fibers for short to moderate transmission distances, e.g., 550 to 2,000 meters (single mode fibers being used for longer transmission distances) due to cost considerations and integration with pre-existing multimode fiber infrastructures. Multimode fibers are designed to carry multiple electromagnetic modes concurrently, each electromagnetic mode having a slightly different reflection angle within the fiber core. Multimode fibers having core diameters of 50 and 62.5 microns are the current standards for high-speed optoelectronic networks.

While LEDs have heretofore been used as the light sources for fiber optic telecommunication systems, LEDs cannot achieve the high data rate speeds inherent in the Gigabit Ethernet. Therefore, the Gigabit Ethernet uses semiconductor laser diodes. Of particular interest for Gigabit Ethernet applications is the vertical cavity surface emitting laser (VCSEL), a specialized laser diode constructed to emit energy at 850 nm and 1300 nm. Although VCSELs are cost effective devices for high-speed multimode fiber transmission applications, there are notable differences in launch characteristics, e.g., size, shape, and power distribution, among VCSELs produced by different manufacturers.

In addition, VCSEL devices exhibit orthogonal polarization states at and above their threshold currents as well as unstable polarization switching, which results in an increase in modal noise. If fiber length is short, as it tends to be in multimode applications, modes do not have time to equalize. VCSEL transmission launch conditions vary over time, leading to excitation of random modes. Launching a laser into multimode fiber generates multiple modes that are subject to differential mode delay, i.e., different propagation times, which adversely affect detector performance.

The foregoing described conditions can lead to random mode excitements in multimode fiber networks such that the mode distribution in the network is a random variable. A random-variable mode distribution, in turn, leads random attenuation characteristics in multimode fibers and/or in-line attenuation mechanisms. Random attenuation characteristics can result in variations in the detected signal levels at the detector, which adversely affects the integrity and reliability of the detector output.

A need exists to provide an attenuation device for use in optoelectronic networks that provides mode-independent attenuation. Such an attenuation device should also be configured to provide a predetermined value of attenuation, depending upon the particular application. The attenuation device should also be easily reconfigurable so that different predetermined values of attenuation can be readily provided for different applications.

SUMMARY OF THE INVENTION

One object of the present invention is to provide a multi-fiber, in-line attenuator module and assembly that provides mode independent attenuation of all modes propagated in an optical pathway.

Another object of the present invention is to provide a multi-fiber, in-line attenuator module and assembly that provides a predetermined value of attention of all modes propagated in an optical pathway, where such predetermined value is a specification of a particular application.

These and other objects are achieved by a multi-fiber in-line attenuator module according to the present invention that is configured for insertion in the fiber optic pathway of an optoelectronic network to provide a predetermined value of attenuation for all propagating modes in the pathway, the module including first and second multi-channel interface members such as ferrules, V-groove arrays, PLC members or combinations thereof, each having a mating face, an interconnect face, and alignment holes and n-optical channels formed therethrough, a multi-fiber ribbon cable terminating in the interconnect face of each multi-channel interface member with the optical fibers thereof disposed in the n-optical channels, alignment pins disposed in the alignment holes of the first and second multi-channel interface members so that the n-optical channels of the first and second multi-channel interface members are optically aligned, a mating clip for retaining the first and second multi-channel interface members in mated combination, and an NDF (neutral density filter) film adhered to at least one of the mating faces of the first and second the multi-channel interface members, the adhered NDF film having a predetermined composition and thickness to provide the predetermined value of attenuation for the multi-fiber in-line attenuator module.

BRIEF DESCRIPTION OF THE DRAWINGS

These and other objects, features, and advantages of the present invention will be apparent from the following detailed description of preferred embodiments of the present invention in conjunction with the accompanying drawings wherein.

DETAILED DESCRIPTION OF PREFERRED EMBODIMENTS

Figure 1:
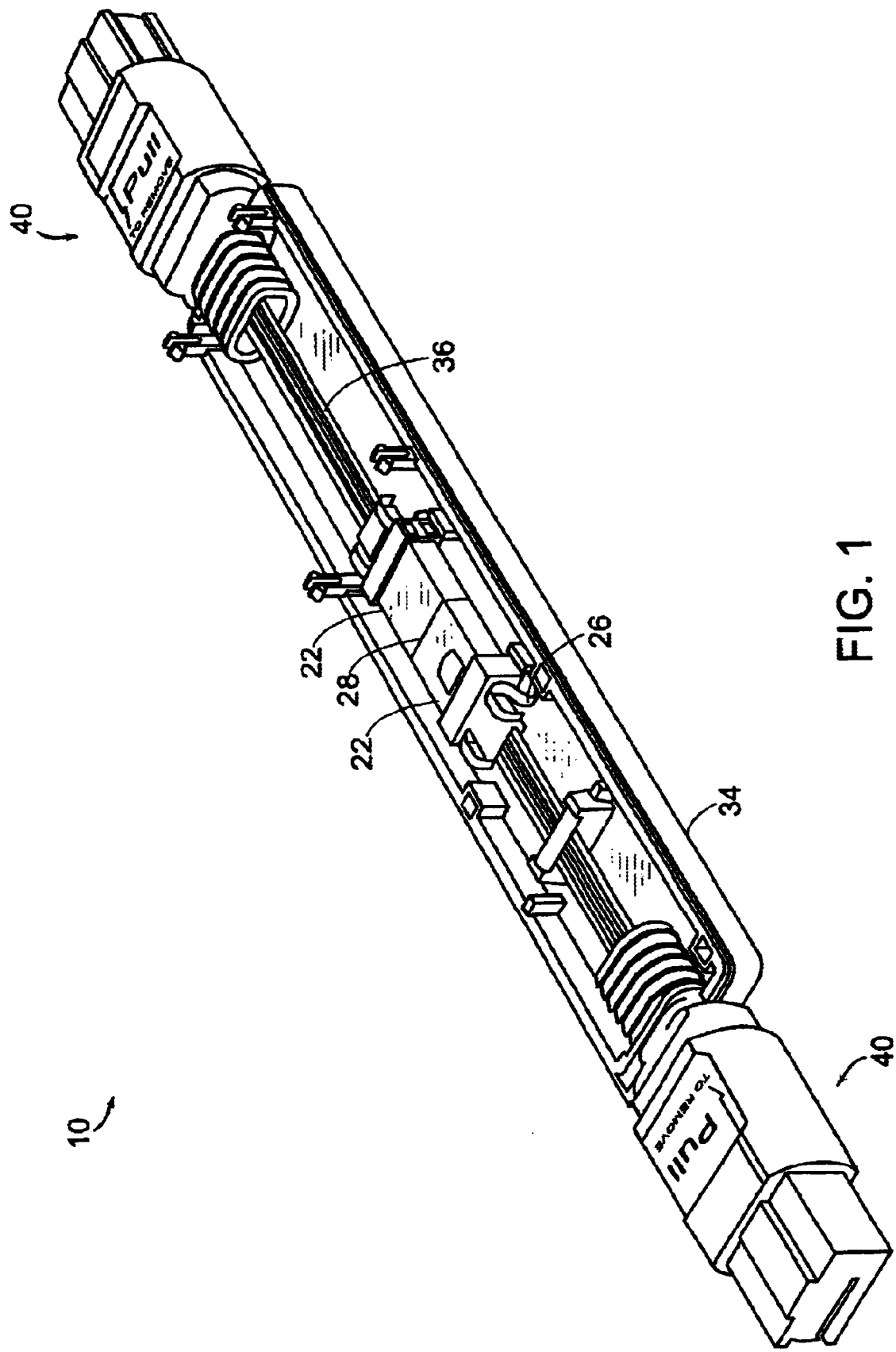
FIG. 1 is a perspective view of one preferred embodiment of a multi-fiber, in-line (mfil) attenuator module and assembly according to the present invention.

Referring now to the drawings wherein like reference numerals indicate corresponding or similar elements through out the several views, FIGS. 1–2 and 3A–3C illustrate one preferred embodiment of a multi-fiber in-line (mfil) attenuator assembly 10 according to the present invention. The mfil attenuator assembly 10 is configured for insertion in the fiber optic pathway of an optoelectronic network between a laser source such as a vertical cavity surface emitting laser and a semiconductor detector and operative to provide a predetermined attenuation of all optical propagating modes in the pathway, i.e., attenuation is mode independent.

The mfil attenuator assembly 10 comprises an mfil attenuator module 20 and assembly hardware 30. The mfil attenuator module 20 includes first and second multi-channel interface members 22, 22, a pair of alignment pins 24, 24, a mating clip 26, and an NDF coating or film 28 applied to at least one of the multi-channel interface members 22 as described below in further detail (see FIGS. 2B, 2C—the thickness of the NDF film 28 is exaggerated for the purpose of illustration).

The multi-channel interface members 22, 22 can be ferrules, V-groove arrays, Planar Light Circuit members, etc., or combinations thereof. A multi-channel interface member 22 such as a ferrule is conventionally fabricated as a unitary structure from a thermosetting or thermoplastic material having a modulus of elasticity less than 40 GPa such as polyphenylene sulfide. Each multi-channel interface member 22 includes a mating face 22a having alignment holes 22b and n optical channels 22c extending therethrough and an interconnect face 22d having an aperture 22e sized to receive the strain-relief member 28 (the alignment holes 22b also extend through the interconnect face 22d—see FIG. 2).

Figure 2:
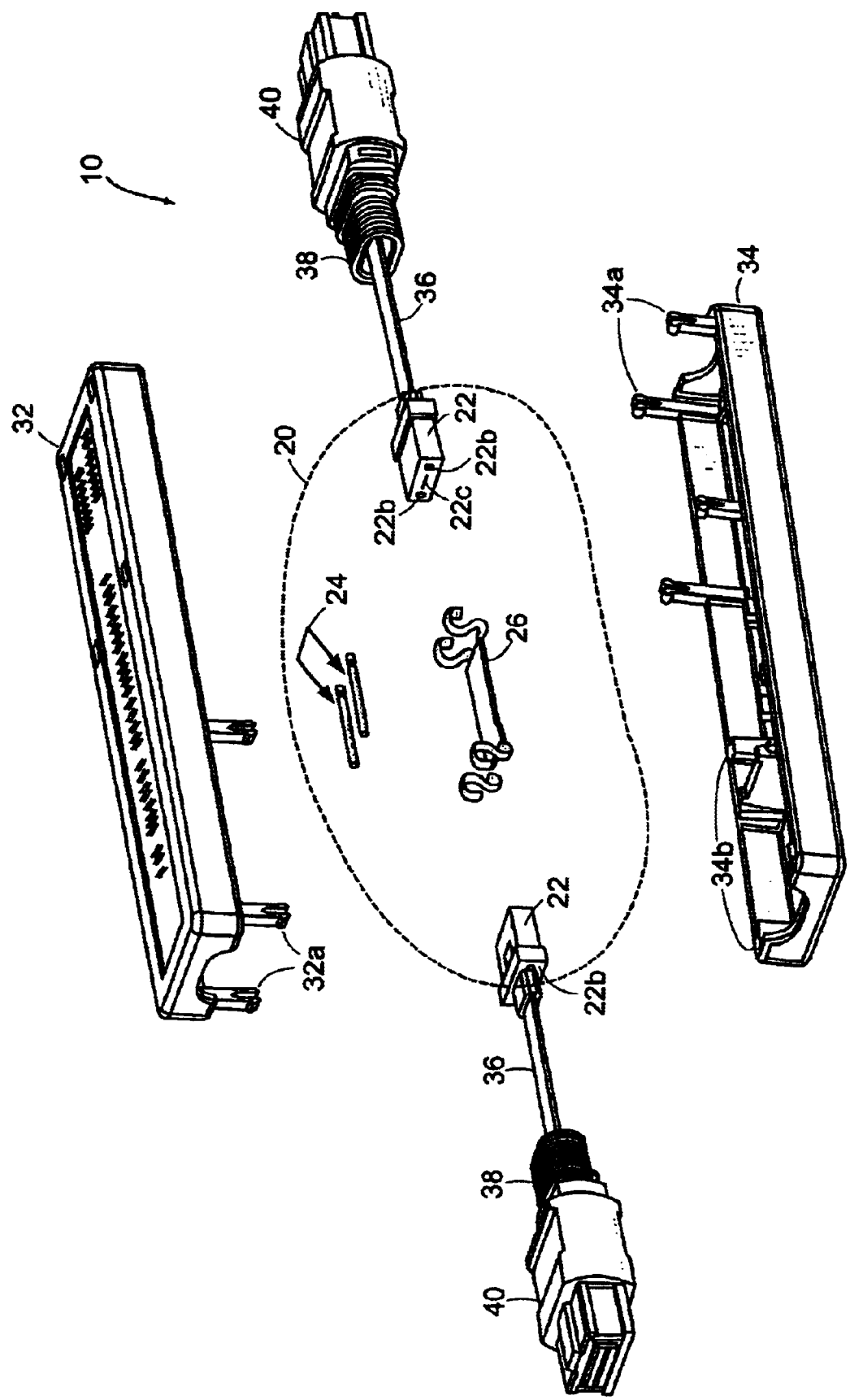
FIG. 2 is an exploded, perspective view of the mfil attenuator module and assembly of FIG. 1.
Figure 3A:
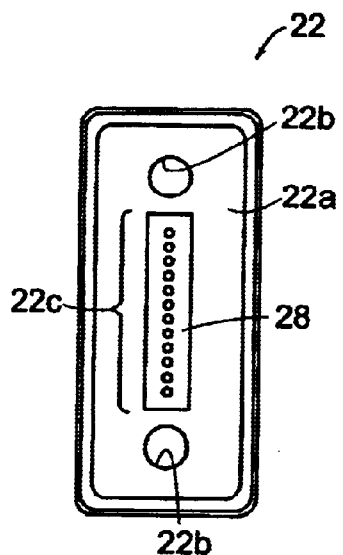
FIG. 3A is an end plan view of a multi-channel ferrule for the mfil attenuator module and assembly of FIG. 1.

With regard to ferrules as the multi-channel interface member(s) 22, there are two standard embodiments for ferrules: a single-row configuration of n optical channels 22c; and a dual-row configuration of n optical channels 22c. In the standard single-row configuration the true positions of the centers of the optical channels 22c lie on a line joining the centers of the alignment holes 22b while in the standard dual-row configuration the true positions of the centers of the optical channels 22c lie on opposed lines spaced a predetermined distance from the line joining the centers of the alignment holes 22b. The multi-channel ferrule 22 illustrated in FIGS. 2 and 3A is a standard single row configuration where n=12 optical channels. Other standard single row configurations include n=4, 6, 8, or 10 optical channels 22c. Standard dual-row configurations include n=16, 20, or 24 optical channels 22c, although multi-channel ferrules having 60 and 72 channels have been developed. While the mfil attenuator assembly 10 of the present invention is configured to accommodate these standard single and dual row configurations, one skilled in the art will appreciate that the assembly 10 can also be adapted for non-standard configurations.

The NDF film 28 of the mfil attenuator module 20 is configured to provide a predetermined value of attenuation that is mode independent, i.e., all modes propagating through the mfil attenuator module 20 are equally attenuated. In the preferred embodiment of the mfil attenuator module 20, the NDF film 28 is adhered to the mating face 22a of one of the two multi-channel interface members 22 comprising the mfil attenuator module 20 and dimensioned to cover the n optical channels 22c on the mating face 22a (See FIGS. 3A, 3B). That is, with the interface members 22, 22 in mated combination, the NDF film 28 is interposed in the optical pathway of the optic fibers disposed within the optical channels 22c, 22c of the interface members 22, 22.

Preferably, the NDF film 28 is adhered to the mating face 22a as a thin film using a vacuum vapor deposition process. A vacuum vapor deposition process allows the thickness of the NDF film 22 adhered to the mating face 22a to be precisely controlled, which in turn, ensures that the NDF film 28 provides a predetermined value of attenuation.

The material forming the NDF film 28 is the primary factor determining the optical power attenuation characteristics provided by the NDF film 28, particularly the capability to provide constant attenuation over all propagated modes. The NDF film 28 may be a metallic material, a dielectric material, or a combination thereof that provides attenuation through absorption, reflection, or a combination thereof. Representative examples of metallic and/or dielectric materials having utility for the NDF film 28 according to the present invention include inconel, glass, and fused silica inconel—other metallic, dielectric, and metallic-dielectric materials having utility for the NDF film 28 will be known to those skilled in the art. A coating may be deposited over the NDF film 28 to provide electrical isolation and/or enhanced durability for the NDF film 28. One material having utility for such an overcoming is silicon dioxide.

For the preferred embodiment of the NDF film 28 of the mfil attenuator module 20 according to the present invention, the material comprising the NDF film 28 is an inconel material. More particularly, the NDF film 28 is an inconel material comprising approximately 76% nickel, 15% chromium, 7% iron, and less than 1% of silicon, manganese, copper, carbon, and sulfur (percentages based upon weight). Specifically, 76.213% nickel, 15.5% chromium, 7.5% iron, 0.25% silicon, 0.25% manganese, 0.20% copper, 0.08% carbon, and 0.007% silicon.

The thickness 28x of the NDF film 28 is another factor affecting the optical power attenuation characteristics provided by the NDF film 28. In particular, the thickness 28x of the NDF film 28 may affect the dispersion of modes propagated in the optical fibers, which can negatively impact the mode-independent attenuation characteristic of the NDF film 28. As a general rule of thumb, the greater the thickness 28x of the NDF film 28, the greater the potential for modal dispersion, and concomitantly, mode dependent attenuation. Any particular optoelectronic network application will specify a requirement for a predetermined value of attenuation. One skilled in the art, using known methodology, can determine the apposite thickness 28x for the NDF film 28 that will provide such a predetermined value of attenuation while concomitantly minimizing or eliminating any adverse impact on the mode independent attenuation characteristic thereof.

For the preferred embodiments of the mfil module 20 and mfil assembly 10 described herein, the inventors have determined that the upper limit for the thickness 28x of the NDF film 28 is forty micrometers (40 μm) to ensure satisfactory mode-independent attenuation. For the preferred embodiments described herein, where the NDF film 28 comprises an inconel material, the thickness 28x of the NDF film 28 is within the range of approximately 0.2 μm to approximately 1.0 μm, which the NDF film 28 having the specific inconel composition disclosed above having a thickness 28x of approximately 0.4μm.

As noted above, the thickness 28x of the NDF film 28 adhered to the mating face 22a can be precisely controlled using a vacuum vapor deposition process. Likewise, a vacuum vapor deposition process allows the composition, as well as the thickness 28x, of the NDF film 28 to be readily varied (and, hence the predetermined value of attenuation provided by the NDF film 28) by changing the base materials used in the vapor deposition process and/or adjusting one or more parameters of the vacuum vapor deposition process, e.g., vapor deposition time. Accordingly, the mfil attenuator module 20 according to the present invention can be readily configured to provide any predetermined value of attenuation.

Any particular application will include a specification identifying the amount of light to be transmitted to the detector, i.e., such specification will implicitly define the predetermined value of attenuation required. A formula such as % Transmission=10 log (1/T), where the transmission is expressed in decibels (dBs), can be used to create such a specification. Other methodologies for specifying the predetermined value of attenuation for a particular application will be known to those skilled in the art.

In the preferred embodiment of the mfil attenuator module 20 according to the present invention, the NDF film 28 having a predetermined composition and thickness 28x (to provide a predetermined value of attenuation) is applied to the mating face 22a of only one of the multi-channel interface member 22 comprising the mfil attenuator module 20. No NDF coating or film is applied to the mating face 22a of the other multi-channel interface member 22 comprising the mfil attenuator module 20. One skilled in the art will appreciate, however, that the mfil attenuator module 20 can also be alternatively configured so that an NDF coating is applied to each of the mating faces 22a, 22a of both multi-channel interface members 22, 22. For this alternative configuration, the methodology is applied to identify the composition and predetermined thickness necessary to provide a predetermined value of attenuation. Then, an NDF coating or film is adhered to each of the mating faces 22a, 22a of the multi-channel interface members 22,22. In this case, however, the NDF film applied to each mating face has a thickness equal to one-half the predetermined thickness. While this alternative configuration is functionally equivalent to the preferred embodiment, it will be appreciated that this alternative configuration is somewhat more expensive inasmuch as an NDF coating or film is applied to both multi-channel interface members 22, 22 (versus application of an NDF film to only one of the multi-channel interface members 22 in the preferred embodiment) in a vacuum vapor deposition process, which increases the per unit cost of the multi-channel ferrules.

The ferrule alignment pins 26, 26 are sized for force-fit insertion into the corresponding alignment holes 22b, 22b of the multi-channel interface members 22, 22. The alignment holes 22b,22b are positioned in the body of the interface members 22, 22 so that when the interface members 22, 22 are mated in combination using the alignment pins 26, 26, the optical channels 22c of the respective interface members 22 are aligned, i.e., optical pathways exist between the mated interface members 22, 22.

The ferrule mating clip 26 is configured to engage the respective interconnect faces 22d of the mated interface members 22, 22. The mating clip is configured to exert opposed spring forces on these interconnect faces 22d sufficient to hold the interface members 22, 22 in mated combination.

The assembly hardware 30 includes complementary housing members 32, 34, first and second multi-fiber ribbon cables 36, 36, first and second strain relief members 38, 38, and first and second MT connectors 40, 40. The housing members 32, 34 are structurally configured to house the components of the mfil attenuator module 20, the multi-fiber ribbon cables 36, 36, and the strain relief members 38, 38. Each housing member 32, 34 also includes mating posts 32a, 32b and complementary mating receptacles 34b (mating receptacles of the housing member 32 are not visible in FIG. 2) so that the housing members 32, 34 can be mated together to form a protective housing for the mfil attenuator module 20.

The multi-fiber ribbon cables 36, 36 comprise a plurality of optical fibers embedded in a sheathing material. Any conventional or standard multi-mode optical fibers, e.g., 50/125 or 62.5/125, currently used in optoelectronic networks can be used for the multi-fiber ribbon cables 36, 36. The multi-fiber ribbon cables 36, 36 are terminated, respectively, in one of the multi-channel interface members 22, 22 and MT connectors 40, 40. The MT connectors 40, 40 are configured to facilitate the insertion of the mfil attenuator assembly 10 in the optical pathway of an optoelectronic network. The multi-fiber ribbon cables 36, 36 are attached to respective MT connectors 40, 40 via strain-relief members 38, 38. The strain-relief members 38, 38 are operative to isolate the multi-fiber ribbon cables 36, 36 from excessive stresses and strains.

Figure 3B:
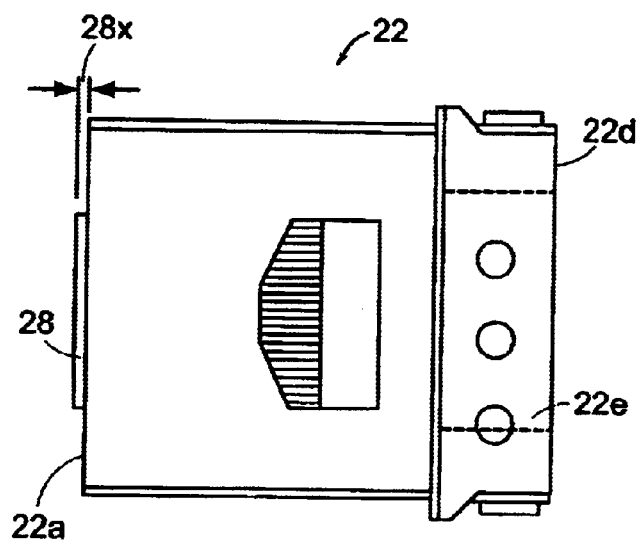
FIG. 3B is a top plan view of the multi-channel ferrule of FIG. 3A.
Figure 3C:
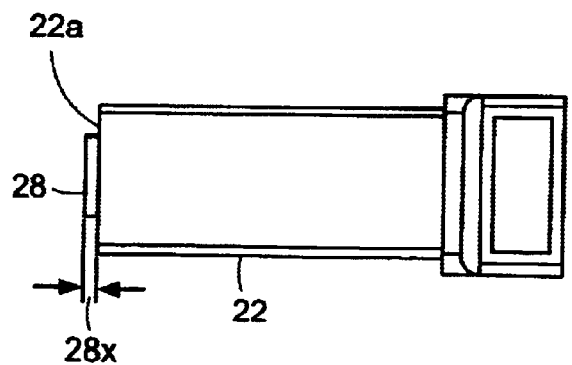
FIG. 3C is a side plan view of the multi-channel ferrule of FIG. 3A.
Figure 4A:
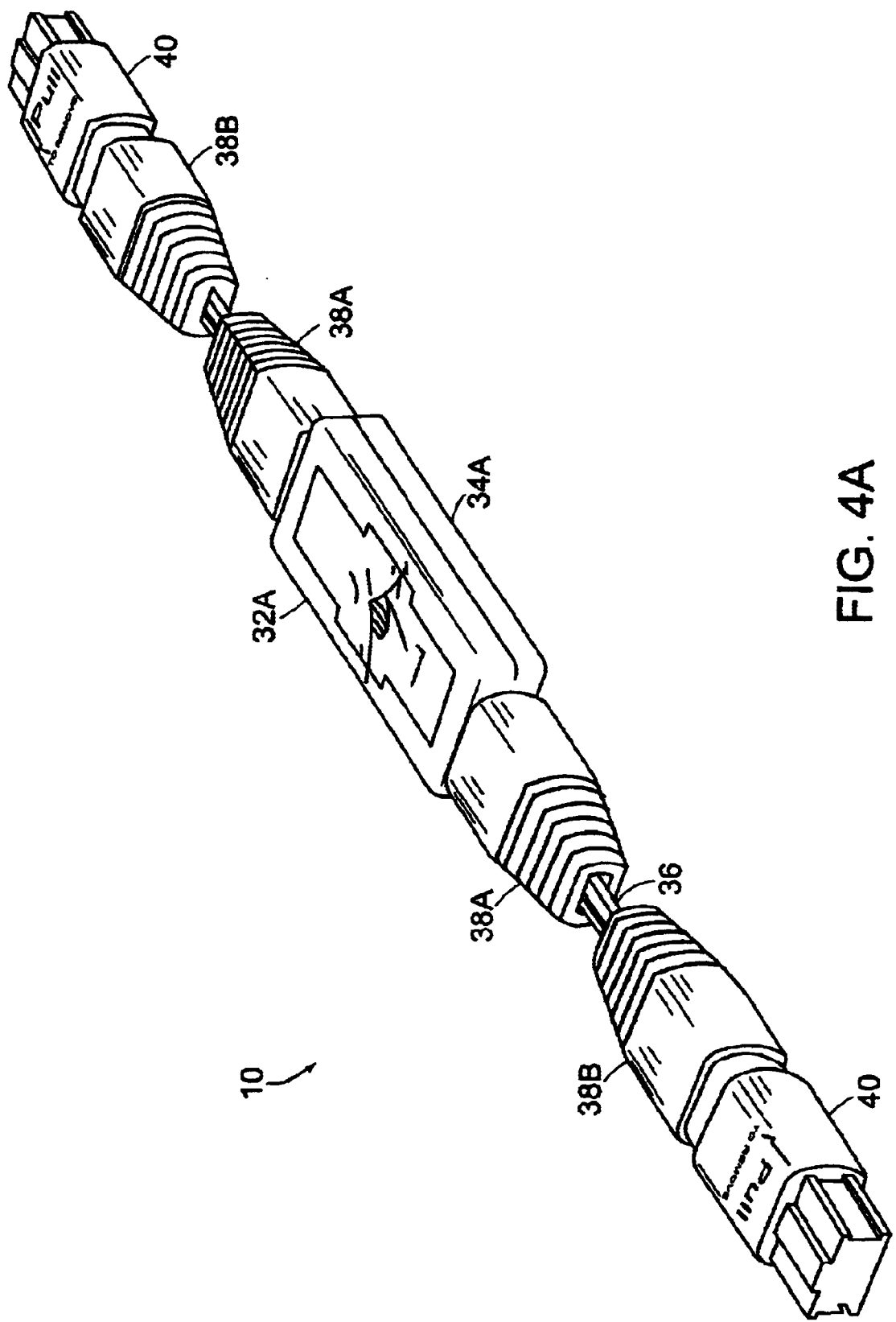
FIG. 4A is a perspective view of another preferred embodiment of a multi-fiber, in-line (mfil) attenuator module and assembly according to the present invention.
Figure 4B:
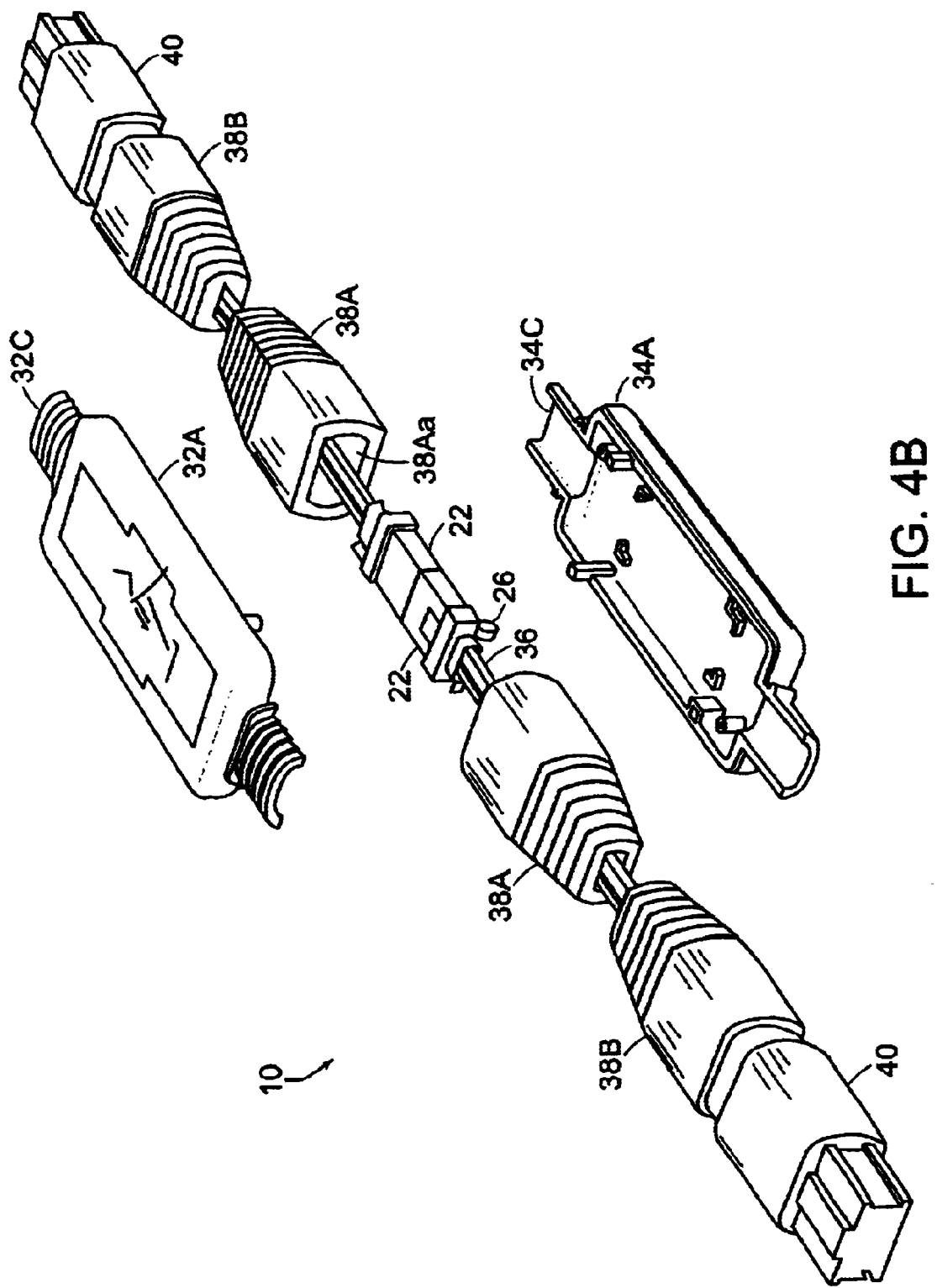
FIG. 4B is an exploded, perspective view of the mfil attenuator module and assembly of FIG. 4A.

Another embodiment of an mfil attenuator module 20 and mfil attenuator assembly 10 according to the present invention is exemplarily illustrated in FIGS. 3A, 3B (the flexible version). This flexible embodiment is similar in configuration to the embodiment of the mfil attenuator module 20 and mfil attenuator assembly 10 described above, with the following exceptions. The housing members 32A, 34A of this flexible configuration are shorter in length than the housing members 32, 34 and include complementary insertion members 32c, 34c. This flexible embodiment also includes first and second pairs of strain relief members 38A, 38A and 38B, 38B instead of a single pair of strain relief members 38. The complementary insertion members 32c, 34c are configured for insertion into the corresponding receptacles 38Aa, 38Aa of the first pair of strain relief members 38A, 38A.

One skilled in the art will appreciate that a variety of modifications and variations of the mfil attenuator module 20 and mfil attenuator assembly 10 described above are possible. Therefore, it is to be understood, that within the scope of the appended claims, the present invention may be practiced other than as expressly described herein.

What is claimed is:

1. A multi-fiber in-line attenuator module providing a predetermined value of mode-independent attenuation, comprising:

first and second multi-channel interface members each having a mating face, an interconnect face, and alignment holes and n-optical channels formed therethrough;

a multi-fiber ribbon cable terminating in the interconnect face of each multi-channel interface member with the optical fibers thereof disposed in the n-optical channels;

alignment pins disposed in the alignment holes of the first and second muti-channel interface members so that the n-optical channels of the first and second multi-channel interface members are aligned;

means for retaining the first and second multi-channel interface members in mated combination; and an NDF film adhered to at least one of the mating faces of the first and second the multi-channel interface members;

the adhered NDF film having a predetermined composition and thickness to provide the predetermined value of mode-independent attenuation for the multi-fiber in-line attenuator module.

2. The multi-fiber in-line attenuator module of claim 1 wherein the NDF film is adhered to only one of the mating faces of the first and second multi-channel interface members in the predetermined thickness.

3. The multi-fiber in-line attenuator module of claim 2 wherein the predetermined thickness of the NDF film is less than forty micrometers.

4. The multi-fiber in-line attenuator module of claim 3 wherein the predetermined thickness of the NDF film is within the range of approximately 0.2 µm to approximately 1.0 µm.

5. The multi-fiber in-line attenuator module of claim 1 wherein the NDF film is adhered to the mating faces of the first and second multi-channel interface members such that the NDF film adhered to the mating face of the first muti-channel interface member and the NDF film adhered to the mating face of the second multi-channel interface member in combination have the predetermined thickness.

6. The multi-fiber in-line attenuator module of claim 1 wherein the predetermined composition of the NDF film is an inconel material.

7. The multi-fiber in-line attenuator module of claim 6 wherein the inconel material comprises nickel, chromium, and iron.

8. The multi-fiber in-line attenuator module of claim 7 wherein the inconel material comprises approximately 76% by weight of nickel, approximately 15% by weight of chromium, approximately 7% by weight of iron, and less than 1% by weight of silicon, manganese, copper, carbon, and sulfur.

9. The multi-fiber in-line attenuator module of claim 1 wherein the retaining means is a mating clip configured to engage the interconnect faces of the first and second multi-channel interface members and to exert opposed spring forces through the engaged interconnect faces to hold the multi-channel interface member in mated combination.

10. The multi-fiber in-line attenuator module of claim 1 further comprising:

an overcoating adhered to the NDF film.

11. The multi-fiber in-line attenuator module of claim 1 wherein at least one of the first and second multi-channel interface members is a ferrule.

12. The multi-fiber in-line attenuator module of claim 1 wherein at least one of the first and second multi-channel interface members is a V-groove array.

13. The multi-fiber in-line attenuator module of claim 1 wherein at least one of the first and second multi-channel interface members is a PLC member.

14. A multi-fiber in-line attenuator assembly, comprising:

a multi-fiber, in-line attenuator module having a predetermined value of attenuation, said multi-fiber, in-line attenuator module including first and second multi-channel interface members each having a mating face, an interconnect face, and alignment holes and n-optical channels formed therethrough, a multi-fiber ribbon cable having one end thereof terminated in the interconnect face of each multi-channel interface member with the optical fibers thereof disposed in the n-optical channels, alignment pins disposed in the alignment holes of the first and second multi-channel interface members so that the n-optical channels of the first and second multi-channel interface members are aligned, means for retaining the first and second multi-channel interface members in mated combination, and an NDF film adhered to at least one of the mating faces of the first and second the multi-channel interface members, the adhered NDF film having a predetermined composition and thickness to provide the predetermined value of attenuation for the multi-fiber in-line attenuator module;

complementary housing members structurally configured to house the multi-fiber, in-line attenuator module;

first and second MT connectors having the other ends of the multi-fiber ribbon cables terminated therein, respectively; and a strain relief member associated with each MT connector disposed in combination with the corresponding multi-fiber ribbon cable.

15. The multi-fiber, in-line attenuator assembly of claim 14 wherein the NDF film is adhered to only one of the mating faces of the first and second multi-channel interface members in the predetermined thickness.

16. The multi-fiber in-line attenuator module of claim 15 wherein the predetermined thickness of the NDF film is less than forty micrometers.

17. The multi-fiber in-line attenuator module of claim 16 wherein the predetermined thickness of the NDF film is within the range of approximately 0.2 µm to approximately 1.0 µm.

18. The multi-fiber in-line attenuator module of claim 14 wherein the NDF film is adhered to the mating faces of the first and second multi-channel interface members such that the NDF film adhered to the mating face of the first multi-channel interface member and the NDF film adhered to the mating face of the second muti-channel interface member in combination have the predetermined thickness.

19. The multi-fiber in-line attenuator module of claim 14 wherein the predetermined composition of the NDF film is an inconel material.

20. The multi-fiber in-line attenuator module of claim 19 wherein the inconel material comprises nickel, chromium, and iron.

21. The multi-fiber in-line attenuator module of claim 20 wherein the inconel material comprises approximately 76% by weight of nickel, approximately 15% by weight of chromium, approximately 7% by weight of iron, and less than 1% by weight of silicon, manganese, copper, carbon, and sulfur.

22. The multi-fiber in-line attenuator module of claim 14 wherein the retaining means is a mating clip configured to engage the interconnect faces of the first and second multi-channel interface members and to exert opposed spring forces through the engaged interconnect faces to hold the multi-channel interface members in mated combination.

23. The multi-fiber in-line attenuator module of claim 14 further comprising:

an overcoating adhered to the NDF film.

24. The multi-fiber in-line attenuator module of claim 14 wherein at least one of the first and second multi-channel interface members is a ferrule.

25. The multi-fiber in-line attenuator module of claim 1 wherein at least one of the first and second multi-channel interface members is a V-groove array.

26. The multi-fiber in-line attenuator module of claim 1 wherein at least one of the first and second multi-channel interface members is a PLC member.

* * * * *